United States Patent
Luo et al.

(10) Patent No.: US 9,541,402 B2
(45) Date of Patent: Jan. 10, 2017

(54) HYBRID NAVIGATION SYSTEM WITH LOCATION BASED SERVICES AND METHOD OF OPERATION THEREOF

(75) Inventors: Hengbin Luo, San Jose, CA (US); Jose Bedolla, Berkeley, CA (US); Yi-Chung Chao, San Jose, CA (US)

(73) Assignee: Telenav, Inc., Santa Clara, CA (US)

( * ) Notice: Subject to any disclaimer, the term of this patent is extended or adjusted under 35 U.S.C. 154(b) by 650 days.

(21) Appl. No.: 12/752,067

(22) Filed: Mar. 31, 2010

(65) Prior Publication Data

US 2011/0246057 A1 Oct. 6, 2011

(51) Int. Cl.
*G01C 21/20* (2006.01)
*G01S 5/02* (2010.01)
*G01S 19/48* (2010.01)

(52) U.S. Cl.
CPC .......... *G01C 21/20* (2013.01); *G01S 5/0263* (2013.01); *G01S 19/48* (2013.01)

(58) Field of Classification Search
CPC ......... G01C 21/20; G01S 5/0263; G01S 19/48
See application file for complete search history.

(56) References Cited

U.S. PATENT DOCUMENTS

| 4,361,202 A * | 11/1982 | Minovitch ......... B60K 31/0008 104/88.02 |
| 6,249,740 B1 | 6/2001 | Ito et al. |
| 6,427,118 B1 * | 7/2002 | Suzuki ............... G01C 21/3682 340/988 |
| 6,553,308 B1 * | 4/2003 | Uhlmann ................ B61L 29/24 340/988 |
| 6,944,533 B2 | 9/2005 | Kozak et al. |
| 7,584,049 B2 | 9/2009 | Nomura |
| 7,822,546 B2 * | 10/2010 | Lee ................................ 701/412 |
| 8,060,297 B2 | 11/2011 | Couckuyt et al. |
| 9,182,498 B2 * | 11/2015 | Luo ......................... G01S 19/48 |
| 2002/0091486 A1 | 7/2002 | Hubschneider et al. |
| 2002/0169549 A1 * | 11/2002 | Kaplan ......................... 701/213 |
| 2004/0174297 A1 | 9/2004 | Cho |
| 2004/0236498 A1 | 11/2004 | Le et al. |
| 2005/0090201 A1 | 4/2005 | Lengies et al. |
| 2006/0270421 A1 * | 11/2006 | Phillips .............. G08B 21/0236 455/457 |
| 2008/0036778 A1 | 2/2008 | Sheha et al. |
| 2009/0157289 A1 * | 6/2009 | Graessley ................. B60L 3/12 701/123 |

(Continued)

OTHER PUBLICATIONS

Gil-Castiñerira et al., "Integration of Nomadic Devices with Automotive User Interfaces," IEEE Transactions of Consumer Electronics, vol. 444, No. 1, Feb. 2009.*

(Continued)

*Primary Examiner* — Asfand Sheikh
(74) *Attorney, Agent, or Firm* — IP Investment Law Group

(57) ABSTRACT

A method of operation of a hybrid navigation system includes: providing a position information for locating a first device; linking a second position to the position information, the second position for locating a second device; generating a planned route with the position information refined by the second position for transferring over a regional network to the first device or the second device; and storing saved route information from the planned route for displaying on the first device when the regional network is not available.

20 Claims, 6 Drawing Sheets

(56) References Cited

U.S. PATENT DOCUMENTS

| | | | |
|---|---|---|---|
| 2009/0157311 A1 | 6/2009 | Seltzer et al. | |
| 2009/0171573 A1* | 7/2009 | Chang | G01C 21/3682 701/533 |
| 2009/0186631 A1* | 7/2009 | Masarie, Jr. | G06F 17/3087 455/456.3 |
| 2009/0240428 A1* | 9/2009 | Shahrestani | G01C 21/3611 701/533 |
| 2010/0004852 A1* | 1/2010 | Kawamura | G01C 21/3682 701/532 |
| 2010/0008255 A1* | 1/2010 | Khosravy | G01C 21/20 370/254 |
| 2010/0039314 A1* | 2/2010 | Gupta | 342/357.1 |
| 2010/0250130 A1* | 9/2010 | Wiegand | G01C 21/3688 701/469 |
| 2011/0125363 A1 | 5/2011 | Blumer et al. | |

OTHER PUBLICATIONS

U.S. Appl. No. 12/752,071, filed Mar. 31, 2010, Luo et al.

\* cited by examiner

HYBRID NAVIGATION SYSTEM WITH LOCATION BASED SERVICES AND METHOD OF OPERATION THEREOF

CROSS-REFERENCE TO RELATED APPLICATION(S)

The present application contains subject matter related to concurrently filed U.S. patent application Ser. No. 12/752,071, fled Mar. 31, 2010. The related application is assigned to TeleNav, Inc. and the subject matter thereof is incorporated herein by reference thereto.

TECHNICAL FIELD

The present invention relates generally to a navigation system, and more particularly to a hybrid navigation system for identifying location based services available to a user in real time operation.

BACKGROUND ART

Today navigation aids are everywhere. Many people rely heavily on navigation instructions to get them efficiently from one point to another. The invention and implementation of the Global Positioning System (GPS) has helped countless people maneuver through congested highways and large cities. Many parcel delivery companies utilize navigation services in their vehicles, based on the GPS, to locate destination addresses.

Since the navigation system has become popular as a route identification tool, it has proliferated to the point that many personal autos are manufactured with a standard navigation system included. Many of these standard systems provide approximate location identification which in most cases has been sufficient to meet the needs of the driving public.

A navigation system may also be implemented in a mobile telephone by using an internal GPS receiver to obtain the mobile telephone's location. Geographic data for both the mobile telephone's location and the destination may be obtained from a geographic database. Accordingly, navigational assistance may be provided to the user of the mobile telephone using geographic data about the mobile telephone's location and a destination location.

Additionally, the telephone may have an integrated database, or an access to an external database, storing address listings of both commercial and residential locations with telephone numbers tagged to the rows as a primary key. Thus, allowing the user of the telephone to input a telephone number as destination information, the address corresponding to that telephone number may be the destination location to which the user is traveling.

Many users of the navigation systems require additional information aside from how to get to their destination. Some users seek identification of on-route restaurants, gas station location, repair service location, or hotel accommodations. As the users become more dependent on the services provided by the navigation system, being without those services can be devastating. In some areas the transmission of navigation service information may be blocked by geographic structures, such as mountains or forests, or in large cities the buildings may prevent continuous operation of the navigation system.

As the users find new ways to take advantage of the flexibility and utility of today's navigation systems, reliability and availability become even more important. A service that becomes unavailable due to interference or geographic features will just tend to frustrate the general public and prevent adoption of the service.

Thus, a need still remains for a navigation system with location based services that can provide reliable and available destination and services information.

In view of the ever increasing reliance on navigational aids and services, it is increasingly critical that answers be found to these problems. In view of the ever-increasing commercial competitive pressures, along with growing consumer expectations and the diminishing opportunities for meaningful product differentiation in the marketplace, it is critical that answers be found for these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

DISCLOSURE OF THE INVENTION

The present invention provides a method of operation of a hybrid navigation system including: providing a position information for locating a first device; linking a second position to the position information, the second position for locating a second device; generating a planned route with the position information refined by the second position for transferring over a regional network to the first device or the second device; and storing saved route information from the planned route for displaying on the first device when the regional network is not available.

The present invention provides a hybrid navigation system including: a communication unit for accessing a first device; a second communication unit for accessing a second device linked to the first device by a communication link includes a communication and navigation controller for accessing a regional network accessed by the first device or the second device; and a storage interface for saved route information stored from the planned route for displaying in the first device when the regional network is not available.

Certain embodiments of the invention have other steps or elements in addition to or in place of those mentioned above. The steps or elements will become apparent to those skilled in the art from a reading of the following detailed description when taken with reference to the accompanying drawings.

BEST MODE FOR CARRYING OUT THE INVENTION

Figure 1:
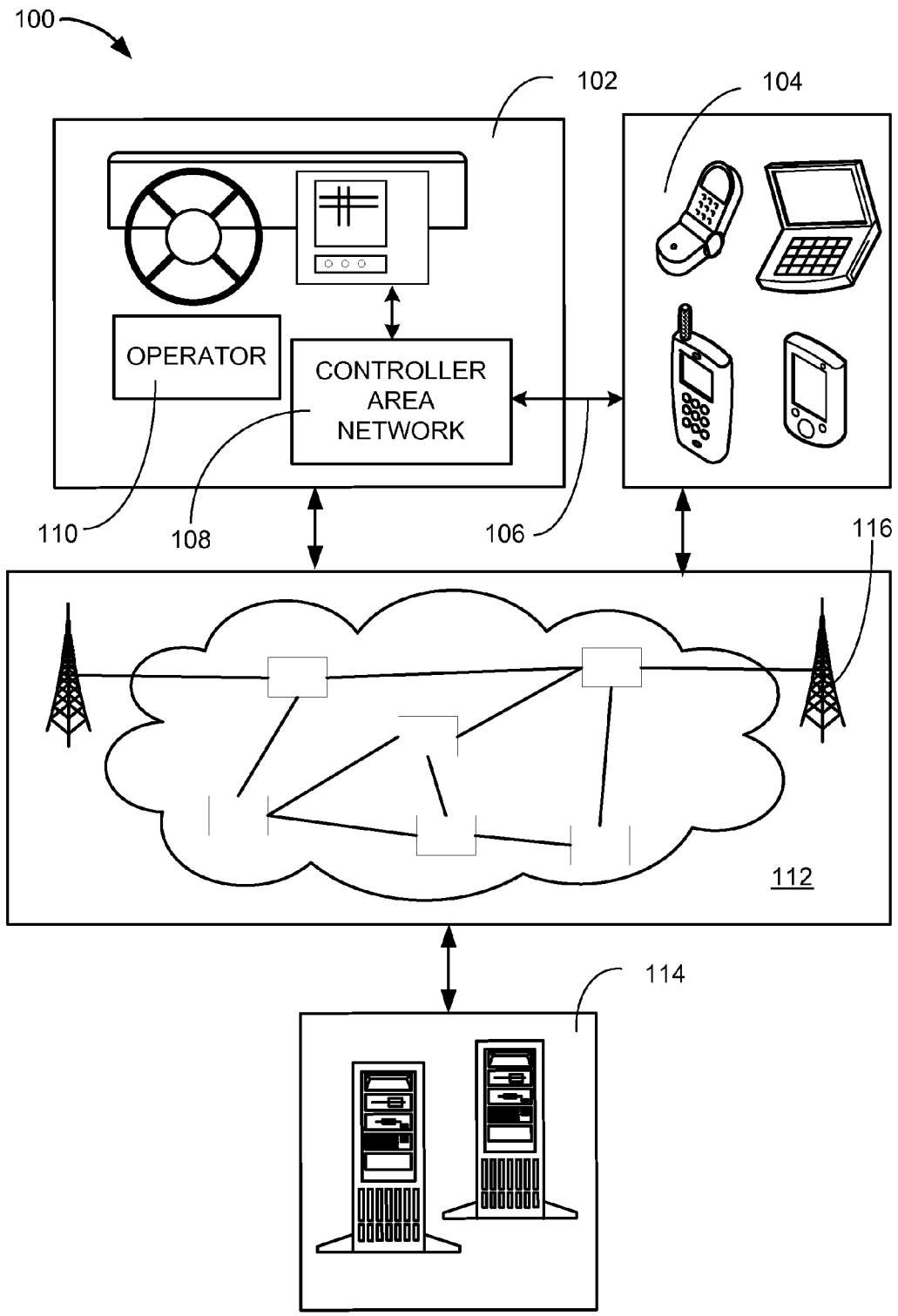
FIG. 1 is a hybrid navigation system with location based services in a first embodiment of the present invention.

The following embodiments are described in sufficient detail to enable those skilled in the art to make and use the invention. It is to be understood that other embodiments would be evident based on the present disclosure, and that system, process, or mechanical changes may be made without departing from the scope of the present invention.

In the following description, numerous specific details are given to provide a thorough understanding of the invention. However, it will be apparent that the invention may be practiced without these specific details. In order to avoid obscuring the present invention, some well-known circuits, system configurations, and process steps are not disclosed in detail.

The drawings showing embodiments of the system are semi-diagrammatic and not to scale and, particularly, some of the dimensions are for the clarity of presentation and are shown exaggerated in the drawing FIGs. Similarly, although the views in the drawings for ease of description generally show similar orientations, this depiction in the FIGs. is arbitrary for the most part. Generally, the invention can be operated in any orientation.

Where multiple embodiments are disclosed and described, having some features in common, for clarity and ease of illustration, description, and comprehension thereof, similar and like features one to another will ordinarily be described with similar reference numerals. The embodiments have been numbered first embodiment, second embodiment, etc. as a matter of descriptive convenience and are not intended to have any other significance or provide limitations for the present invention.

For expository purposes, the term "horizontal" as used herein is defined as a plane parallel to the plane or surface of the Earth, regardless of its orientation. The term "vertical" refers to a direction perpendicular to the horizontal as just defined. Terms, such as "above", "below", "bottom", "top", "side" (as in "sidewall"), "higher", "lower", "upper", "over", and "under", are defined with respect to the horizontal plane, as shown in the figures. The term "on" means that there is direct contact between elements with no intervening materials.

The term "processing" as used herein includes calculating, encoding, decoding, storing, managing, cataloging, or preparing for display any data associated with the works of this invention.

Referring now to FIG. 1, therein is shown a hybrid navigation system 100 with location based services in a first embodiment of the present invention. The hybrid navigation system 100 includes a first device 102, such as a client or a mobile navigation system, communicating with a second device 104, such as a personal communication device, cell phone, notebook computer, personal digital assistant (PDA), or hand held GPS, through a communication link 106, such as a wireless or wired communication link.

The communication link 106 may couple the second device 104 to a controller area network (CAN) 108 within the first device 102. While the controller area network 108 may be involved in more of the routine operation of the first device 102, it supplies key information to an operator 110. It is understood that the second device 104 may be in the possession and operated by the operator 110 or another individual in the proximity of the first device 102.

For example, the first device 102 can be of any of a variety of mobile devices, such as an automotive telematic navigation system, or other multi-functional mobile communication or entertainment device. The first device 102 can be a standalone device, or can be incorporated with a vehicle, for example a motorcycle, car, truck, bus, or train. The first device 102 can couple through the communication link 106 to communicate with the second device 104.

For illustrative purposes, the hybrid navigation system 100 is described with the first device 102 as a mobile device, although it is understood that the first device 102 can be different types of devices. For example, the first device 102 can also be a non-mobile computing device, such as a server, a server farm, or a desktop computer.

The second device 104 can be any of a variety of centralized or decentralized computing devices, such as a cellular phone, personal digital assistant, a notebook computer, a mobile GPS. For example, the second device 104 can be a computer, grid computing resources, a virtualized computer resource, cloud computing resource, routers, switches, peer-to-peer distributed computing devices, or a combination thereof.

The second device 104 can be centralized in a single computer, distributed across different computers, distributed across different geographical locations, or embedded within a telecommunication network. The second device 104 can have a means for coupling with the communication link 106 to communicate with the first device 102. The second device 104 can also be a client or a server type device as described for the first device 102. The second device 104 can include a standalone device, or can exchange resources with a vehicle, for example a motorcycle, car, truck, bus, or train, in close proximity, within 10 meters range, by peer-to-peer communication. The peer-to-peer communication allows two or more servers to directly communicate without an intervening controller. Such a device is known as a peer-to-peer server.

It has been discovered that the combination of the first device 102 and the second device 104 coupled through the communication link may provide an enhanced position for use by the operator 110. The first device 102 may determine a position information by accessing a data source 114 such as a satellite signal from the regional network while the second device 104 may calculate a second position by using triangulation from two or more nodes 116, such as cellular towers or cellular repeaters, to determine a location. The triangulation may be performed by measuring a time differential between the arrival of an uplink signal from two or more of the nodes 116. The position information can be linked to the second position. The hybrid navigation system 100 then combines the position information from the first device 102 with the location of the second device 104 for refining an enhanced position. The enhanced position can be used to generate a planned route using the enhanced position and a destination.

It has also been discovered that the second device 104 may provide a future view of services that may be available farther along the planned route that can provide location based services information in the event a regional network 112 is not available for any reason. The future view of services may include maps, points of interest, as determined by the configuration provided by the operator 110, advertisements, and coupons. The second device 104 may pipeline the location based services information as soon as the regional network 112 is once again available.

Both the first device 102 and the second device 104 may be coupled to the regional network 112, such as a geographically dispersed communication network that may include a variety of networks linked together. For example, the regional network 112 can include wireless communication, wired communication, optical, ultrasonic, or the combination thereof. Satellite communication, cellular communication, Bluetooth, Infrared Data Association standard (IrDA), wireless fidelity (WiFi), and worldwide interoperability for microwave access (WiMAX) are examples of wireless communication that can be included in the regional network 112. Ethernet, digital subscriber line (DSL), fiber to the home (FTTH), and plain old telephone service (POTS) are examples of wired communication that can be included in the regional network 112 as well.

The regional network 112 may link the first device 102 and the second device 104 to the data source 114, such as a computer, server, or server network. The data source 114 may provide requested information regarding route identification and location based services.

In another example, the data source 114 can be a particularized machine, such as a mainframe, a server, a cluster server, rack mounted server, or a blade server, or as more specific examples, an IBM System z10™ Business Class mainframe or a HP ProLiant ML™ server. In yet another example, the second device 104 can be a particularized machine, such as a portable computing device, a thin client, a notebook, a netbook, a smartphone, personal digital assistant, or a cellular phone, and as specific examples, an Apple iPhone™, Palm Centro™, or Moto Q Global™.

For illustrative purposes, the hybrid navigation system 100 is described with the data source 114 as a non-mobile computing device, although it is understood that the data source 114 can be different types of computing devices. For example, the data source 114 can also be a mobile computing device, such as notebook computer, another client device, or a different type of client device.

Also for illustrative purposes, the hybrid navigation system 100 is shown with the second device 104 and the first device 102 as end points of the regional network 112, although it is understood that the hybrid navigation system 100 can have a different partition between the first device 102, the second device 104, and the regional network 112. For example, the first device 102, the second device 104, or a combination thereof can also function as part of the regional network 112.

Further, the regional network 112 can traverse a number of network topologies and distances. For example, the regional network 112 can include direct connection, personal area network (PAN), local area network (LAN), metropolitan area network (MAN), wide area network (WAN) or any combination thereof.

The hybrid navigation system 100 may provide location based services to the operator 110 of the first device 102. The location based services may be configured to the unique interests of the operator 110 and the area of travel. The location based services may include area restaurants, entertainment locations, technical services, and the like. The desired location based services may be pre-configured for the hybrid navigation system 100.

Figure 2:
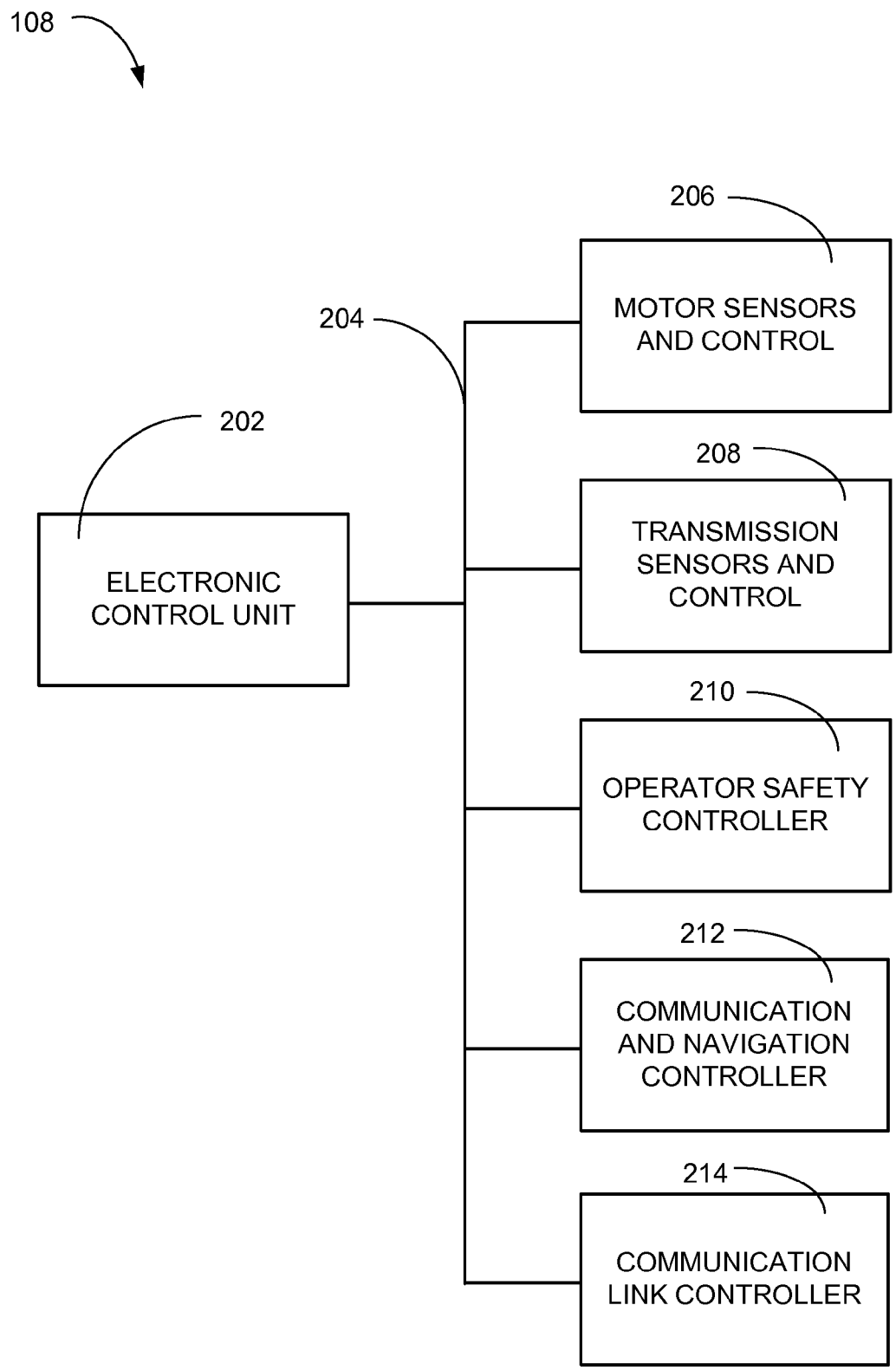
FIG. 2 is a block diagram of the controller area network in an embodiment of the present invention.

Referring now to FIG. 2, therein is shown a block diagram of the controller area network 108 in an embodiment of the present invention. The block diagram of the controller area network 108 depicts an electronic control unit (ECU) 202, such as a main processing unit for the controller area network 108. A controller area network (CAN) bus 204 may couple the electronic control unit 202 to a series of specialized controllers that may monitor and control the operation of a vehicle.

A motor sensor and control block 206, such as a controller that may manage the operation of a vehicles motor function, may manage the operation of the motor to meet the demands of the operator 110, of FIG. 1. A transmission sensors and control 208 may monitor pressures in the transmission and shift gears at an appropriate time to meet the demands of the operator 110.

An operator safety controller 210 may manage sensors and warnings that provide the operator aids in avoiding hazards while operating the vehicle that contains the controller area network 108. Some of the operator aids may include, but are not limited to, a rear bumper camera, side ranging sensors, forward ranging sensors, low light visibility devices, and the like.

A communication and navigation controller 212 may manage the on board navigation system as well as display functions associated with the vehicle. The display functions may include, but are not limited to, a turn by turn display of a planned route to be taken to arrive at a destination chosen by the operator 110. The warning functions may include, but are not limited to, proximity alerts, signal management for communication to other operators, communication interface controls, such as volume controls, channel selection, or entertainment device management.

A communication link controller 214 may provide the link management function for the communication link 106, of FIG. 1, between the first device 102, of FIG. 1, and the second device 104, of FIG. 1. In this configuration the second device 104 may act as a proxy server in order to provide the future view of services available along a planned route. The second device 104 may pipeline, such as queuing contiguous blocks of information, selected information about the planned route including location based services. Such information may be used by the communication and navigation controller 212 if the regional network 112, of FIG. 1, becomes unavailable for any reason for any length of time.

Figure 3:
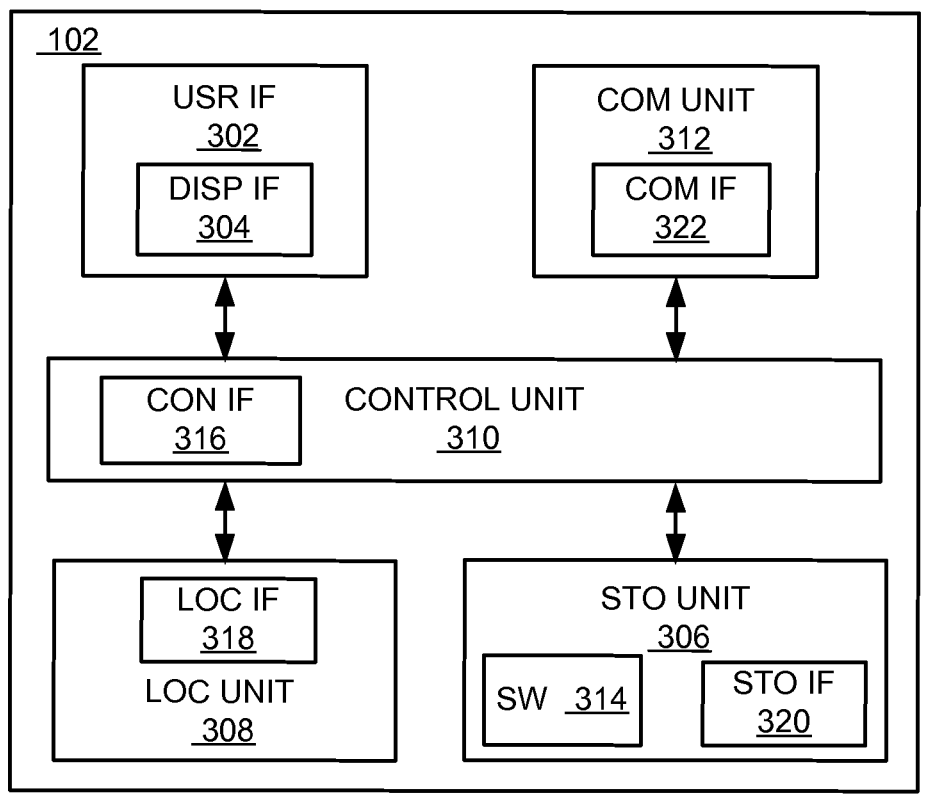
FIG. 3 is an exemplary block diagram of the first device of FIG. 1.

Referring now to FIG. 3, therein is shown an exemplary block diagram of the first device 102 of FIG. 1. The first device 102 can include a user interface 302, a storage unit 306, a global positioning system 308, a control unit 310, and a communication unit 312.

The user interface 302 allows the operator 110, of FIG. 1, to interface and interact with the first device 102. While the operator 110 may perform other tasks associated with operating the first device 102, some interface is provided to manage the control functions of the first device 102. The user interface 302 can include, but is not limited to, an input device and an output device. Examples of the input device of the user interface 302 can include a keypad, a touchpad, soft-keys, a keyboard, a microphone, or any combination thereof to provide data and communication inputs. Examples of the output device of the user interface 302 can include a display interface 304. The display interface 304 can include a display, a projector, a video screen, a speaker, or any combination thereof.

The control unit 310 can execute a program code 314 to provide the intelligence of the hybrid navigation system 100. The control unit 310 can operate the user interface 302 to display information generated by the hybrid navigation system 100. The control unit 310 can also execute the program code 314 for the other functions of the hybrid navigation system 100, including receiving location information from the global positioning system 308. The control unit 310 can further execute the program code 314 for interaction with the communication link 106 of FIG. 1 via the communication unit 312.

The control unit 310 can be implemented in a number of different manners. For example, the control unit 310 can be a processor, an embedded processor, a microprocessor, a hardware control logic, a hardware finite state machine (FSM), a digital signal processor (DSP), or a combination thereof.

The control unit 310 can include a controller interface 316. The controller interface 316 can be used for communication between the control unit 310 and other functional units in the first device 102. The controller interface 316 can also be used for communication that is external to the first device 102.

The controller interface 316 can receive information from the other functional units or from external sources, or can transmit information to the other functional units or to external destinations. The external sources and the external destinations refer to sources and destinations external to the first device 102.

The controller interface 316 can be implemented in different ways and can include different implementations depending on which functional units or external units are being interfaced with the controller interface 316. For example, the controller interface 316 can be implemented with a pressure sensor, an inertial sensor, a micro-electro-mechanical system (MEMS), optical circuitry, waveguides, wireless circuitry, wire-line circuitry, or a combination thereof.

The global positioning system 308 can generate location information, current heading, and current speed of the first device 102, as examples. The global positioning system 308 can be implemented in many ways. For example, the global positioning system 308 can function as at least a part of a global positioning system (GPS), an inertial navigation system, a cellular-tower location system, a pressure location system, or any combination thereof.

The global positioning system 308 can include a location interface 318. The location interface 318 can be used for communication between the global positioning system 308 and other functional units in the first device 102. The location interface 318 can also be used for communication that is external to the first device 102.

The location interface 318 can receive information from the other functional units or from external sources, or can transmit information to the other functional units or to external destinations. The external sources and the external destinations refer to sources and destinations external to the first device 102.

The location interface 318 can include different implementations depending on which functional units or external units are being interfaced with the global positioning system 308. The location interface 318 can be implemented with technologies and techniques similar to the implementation of the controller interface 316.

The storage unit 306 can store the program code 314. The storage unit 306 can also store the relevant information, such as advertisements, points of interest (POI), navigation routing entries, or any combination thereof.

The storage unit 306 can be a volatile memory, a nonvolatile memory, an internal memory, an external memory, or a combination thereof. For example, the storage unit 306 can be a nonvolatile storage such as non-volatile random access memory (NVRAM), Flash memory, disk storage, or a volatile storage such as static random access memory (SRAM).

The storage unit 306 can include a storage interface 320. The storage interface 320 can be used for communication between the global positioning system 308 and other functional units in the first device 102. The storage interface 320 can also be used for communication that is external to the first device 102.

The storage interface 320 can receive information from the other functional units or from external sources, or can transmit information to the other functional units or to external destinations. The external sources and the external destinations refer to sources and destinations external to the first device 102, which may include the second device 104, of FIG. 1. In the operation of the hybrid navigation system 100, the second device 104 may act as a proxy server for the first device 102. The second device 104 may retrieve location based services information for segments, of the planned route, that have not yet been reached. This information may be stored by the storage unit 306 for use if the regional network 112, of FIG. 1, becomes unavailable for any reason.

The storage interface 320 can include different implementations depending on which functional units or external units are being interfaced to the storage unit 306. The storage interface 320 can be implemented with technologies and techniques similar to the implementation of the controller interface 316.

The communication unit 312 can enable external communication to and from the first device 102. For example, the communication unit 312 can permit the first device 102 to communicate with the second device 104 of FIG. 1, through the communication link 106, of FIG. 1.

The communication unit 312 can also function as a communication hub allowing the second device 104 to function as part of the first device 102. The communication unit 312 can include active and passive components, such as microelectronics or an antenna, for interaction with the communication link 106. The communication link 106 may be implemented as a Bluetooth network. In such a case the transmit/receive electronics and appropriate support software would reside in the communication unit 312.

The communication unit 312 can include a communication interface 322. The communication interface 322 can be used for communication between the communication unit 312 and other functional units in the first device 102. The communication interface 322 can receive information from the other functional units or can transmit information to the other functional units.

The communication interface 322 can include different implementations depending on which functional units are being interfaced with the communication unit 312. The communication interface 322 can be implemented with technologies and techniques similar to the implementation of the controller interface 316.

For illustrative purposes, the program code 314 is shown to reside in the storage unit 306, but it is understood that the program code 314 can be partitioned differently such that some or all of its function can be in the control unit 310, the global positioning system 308, or the communication unit 312. Also, the first device 102 can include other functional units not shown in FIG. 3 for clarity.

Figure 4:
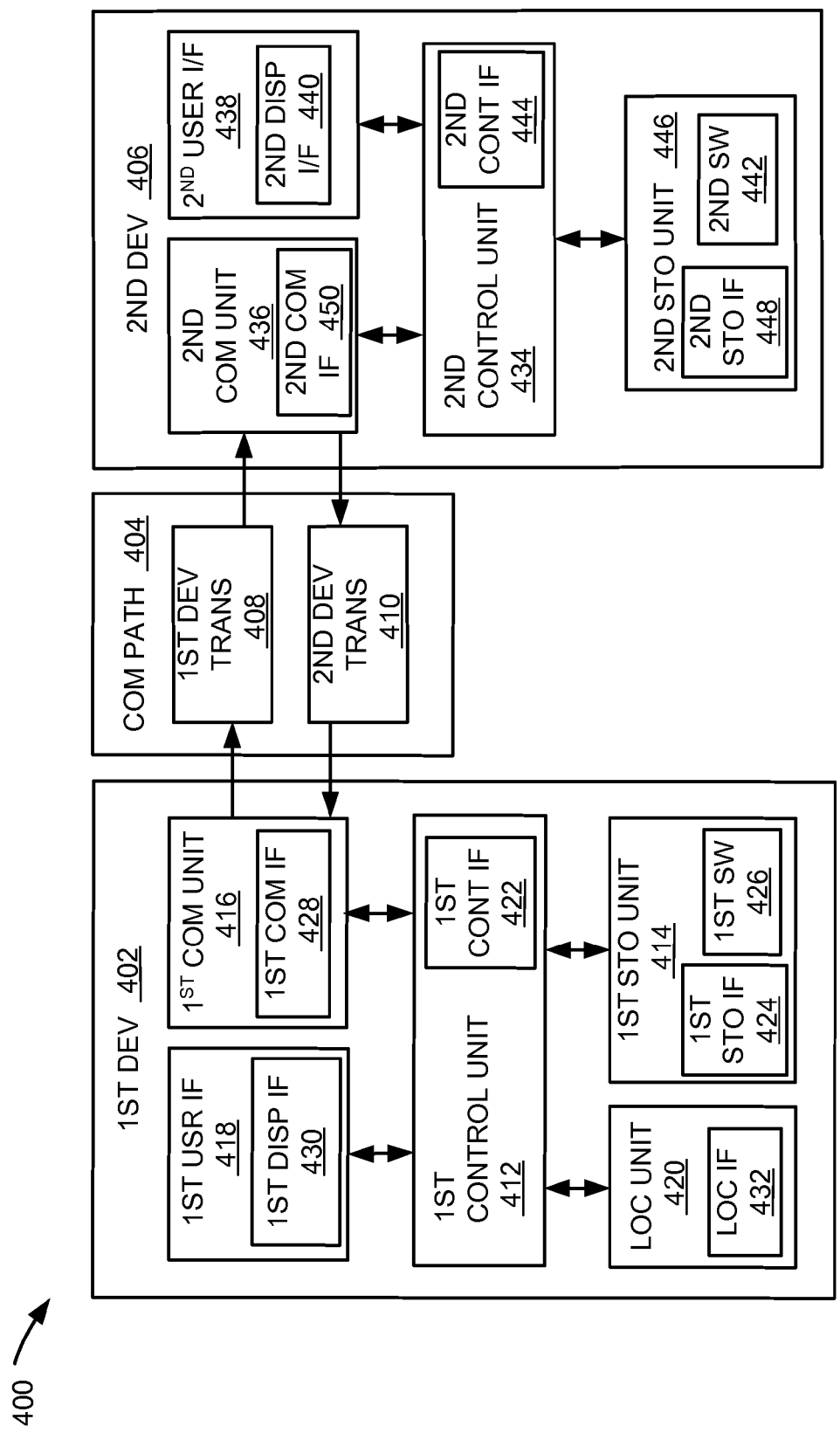
FIG. 4 is a functional block diagram of a hybrid navigation system in an embodiment of the present invention.

Referring now to FIG. 4, therein is shown a functional block diagram of a hybrid navigation system 400 in an embodiment of the present invention. The functional block diagram of the hybrid navigation system 400 depicts a first device 402, a communication link 404, and a second device 406. The first device 402 can communicate with the second device 406 over the communication link 404. For example, the first device 402, the communication link 404, and the second device 406 can be the first device 102 of FIG. 1, the communication link 106 of FIG. 1, and the second device 104 of FIG. 1, respectively.

In the operation of the hybrid navigation system 400, resources of the second device 406 may be made available to the first device 402. The second device 406 may download and execute a software program that allows the second device 406 to serve as a proxy server, such as the TeleNav Proxy, in order to provide information for the future view of the planned route including location based services.

The first device 402 can send information in a first device transmission 408 over the communication link 404 to the second device 406. The second device 406 can send information in a second device transmission 410 over the communication link 404 to the first device 402. These exchanges may take place concurrently and the associated overhead may be managed by a communication standard, such as Bluetooth.

For brevity of description in this embodiment of the present invention, the first device 402 will be described as a client device and the second device 406 will be described as a server device. The present invention is not limited to this selection for the type of devices. The selection is an example of the present invention.

The first device 402 can include a first control unit 412, a first storage unit 414, a first communication unit 416, a first user interface 418, and a location unit 420. The first device 402 can be similarly described by the first device 102.

As an example, the location unit 420 may include the local sensors and monitors for the first device 402. The monitors may include a GPS locator, a directional compass, a speedometer, an odometer, and any visual sensors or cameras. It is understood that this is an example only and the GPS locator may reside in another device, such as the second device 406.

The first control unit 412 can include a first control interface 422. The first control unit 412 and the first control interface 422 can be similarly described as the control unit 310 of FIG. 3 and the control interface 316 of FIG. 3, respectively.

The first storage unit 414 can include a first storage interface 424. The first storage unit 414 and the first storage interface 424 can be similarly described as the storage unit 306 of FIG. 3 and the storage interface 320 of FIG. 3, respectively. A first software 426 can be stored in the first storage unit 414.

The first communication unit 416 can include a first communication interface 428. The first communication unit 416 and the first communication interface 428 can be similarly described as the communication unit 312 of FIG. 3 and the communication interface 322 of FIG. 3, respectively.

The first user interface 418 can include a first display interface 430. The first user interface 418 and the first display interface 430 can be similarly described as the user interface 302 of FIG. 3 and the display interface 304 of FIG. 3, respectively.

The location unit 420 can include a location interface 432. The location unit 420 and the location interface 432 can be similarly described as the global positioning system 308 of FIG. 3 and the location interface 318 of FIG. 3, respectively. While it is possible that the first device 102, of FIG. 1 may be similar to the first device 402, this is not a requirement and they may differ in architecture and performance.

The second device 406 can be optimized for implementing the present invention in a multiple device embodiment with the first device 402. The second device 406 can provide the additional or higher performance processing power compared to the first device 402. The second device 406 can include a second control unit 434, a second communication unit 436, and a second user interface 438.

The second user interface 438 allows the operator 110, of FIG. 1, to interface and interact with the second device 406. The second user interface 438 can include an input device and an output device. Examples of the input device of the second user interface 438 can include a keypad, a touchpad, soft-keys, a keyboard, a microphone, or any combination thereof to provide data and communication inputs. Examples of the output device of the second user interface 438 can include a second display interface 440. The second display interface 440 can include a display, a projector, a video screen, a speaker, or any combination thereof.

The second control unit 434 can execute a second software 442 to provide the intelligence of the second device 406 of the hybrid navigation system 400. The second software 442 can operate in conjunction with the first software 426 in order to provide continued navigational support while the regional network 112, of FIG. 1, is not available. The second control unit 434 can provide additional performance and capabilities as compared to the first control unit 412 or the control unit 310.

The second control unit 434 can operate the second user interface 438 to display information. The second control unit 434 can also execute the second software 442 for the other functions of the hybrid navigation system 400, including operating the second communication unit 436 to communicate with the first device 402 over the communication link 404.

The second control unit 434 can be implemented in a number of different manners. For example, the second control unit 434 can be a processor, an embedded processor, a microprocessor, a hardware control logic, a hardware finite state machine (FSM), a digital signal processor (DSP), or a combination thereof.

The second control unit 434 can include a second controller interface 444. The second controller interface 444 can be used for communication between the second control unit 434 and other functional units in the second device 406. The second controller interface 444 can also be used for communication that is external to the second device 406.

The second controller interface 444 can receive information from the other functional units or from external sources, or can transmit information to the other functional units or to external destinations. The external sources and the external destinations refer to sources and destinations external to the second device 406.

The second controller interface 444 can be implemented in different ways and can include different implementations depending on which functional units or external units are being interfaced with the second controller interface 444. For example, the second controller interface 444 can be implemented with a pressure sensor, an inertial sensor, a micro-electromechanical system (MEMS), optical circuitry, waveguides, wireless circuitry, wire-line circuitry, or a combination thereof.

A second storage unit 446 can store the second software 442. The second storage unit 446 can also store the relevant information, such as maps, advertisements, points of interest (POI), navigation routing entries, or any combination thereof for points beyond the current location of the first device 402 and the second device 406. The second storage unit 446 can be sized to provide the additional storage capacity to supplement the first storage unit 414.

For illustrative purposes, the second storage unit 446 is shown as a single element, although it is understood that the second storage unit 446 can be a distribution of storage elements. Also for illustrative purposes, the hybrid navigation system 400 is shown with the second storage unit 446 as a single hierarchy storage system, although it is understood that the hybrid navigation system 400 can have the second storage unit 446 in a different configuration. For example, the second storage unit 446 can be formed with different storage technologies forming a memory hierarchal system including different levels of caching, main memory, rotating media, or off-line storage.

The second storage unit 446 can include a volatile memory, a nonvolatile memory, an internal memory, an external memory, or a combination thereof. For example, the second storage unit 446 can include a nonvolatile storage such as non-volatile random access memory (NVRAM), Flash memory, disk storage, or a volatile storage such as static random access memory (SRAM).

The second storage unit 446 can include a second storage interface 448. The second storage interface 448 can be used for communication between the location unit 420, of the first device 402, and other functional units within the second device 406. The second storage interface 448 can also be used for communication that is external to the second device 406.

The second storage interface 448 can receive information from the other functional units or from external sources, or can transmit information to the other functional units or to external destinations. The external sources and the external destinations refer to sources and destinations external to the second device 406, such as the regional network 112.

The second storage interface 448 can include different implementations depending on which functional units or external units are being interfaced with the second storage unit 446. The second storage interface 448 can be implemented with technologies and techniques similar to the implementation of the second controller interface 444.

The second communication unit 436 can enable external communication to and from the first device 402. For example, the second communication unit 436 can permit the second device 406 to communicate with the first device 402 over the communication link 404.

The second communication unit 436 can include a second communication interface 450. The second communication interface 450 can be used for communication between the second communication unit 436 and other functional units in the second device 406. The second communication interface 450 can receive information from the other functional units or can transmit information to the other functional units.

The second communication interface 450 can include different implementations depending on which functional units are being interfaced with the second communication unit 436. The second communication interface 450 can be implemented with technologies and techniques similar to the implementation of the second controller interface 444.

The first communication unit 416 can couple with the communication link 404 to send information to the second device 406 in the first device transmission 408. The second device 406 can receive information in the second communication unit 436 from the first device transmission 408 of the communication link 404.

The second communication unit 436 can couple with the communication link 404 to send information to the first device 402 in the second device transmission 410. The first device 402 can receive information in the first communication unit 416 from the second device transmission 410 of the communication link 404. The hybrid navigation system 400 can be executed by the first control unit 412, the second control unit 434, or a combination thereof.

For illustrative purposes, the second device 406 is shown with the partition having the second user interface 438, the second storage unit 446, the second control unit 434, and the second communication unit 436, although it is understood that the second device 406 can have a different partition. For example, the second software 442 can be partitioned differently such that some or all of its function can be in the second control unit 434 and the second communication unit 436. Also, the second device 406 can include other functional units not shown in FIG. 4 for clarity.

The functional units in the first device 402 can work individually and independently of the other functional units. The first device 402 can work individually and independently from the second device 406 and the communication link 404.

The functional units in the second device 406 can work individually and independently of the other functional units. The second device 406 can work individually and independently from the first device 402 and the communication link 404.

For illustrative purposes, the hybrid navigation system 400 is described by operation of the first device 402 and the second device 406. It is understood that the first device 402 and the second device 406 can operate any of the modules and functions of the hybrid navigation system 400. For example, the first device 402 is described to operate the location unit 420, although it is understood that the second device 406 can also operate the location unit 420.

It has been discovered that by utilizing the second device 406 as a proxy server, to retrieve information, such as maps, advertisements, points of interest (POI), navigation routing entries, or any combination thereof for points beyond the current location of the first device 402 and the second device 406, the hybrid navigation system 400 can operate without access to the regional network 112. When the regional network 112 once again becomes available the second device 406 may retrieve new information in order to maintain location based services beyond the current location of the first device 402 and the second device 406.

Figure 5:
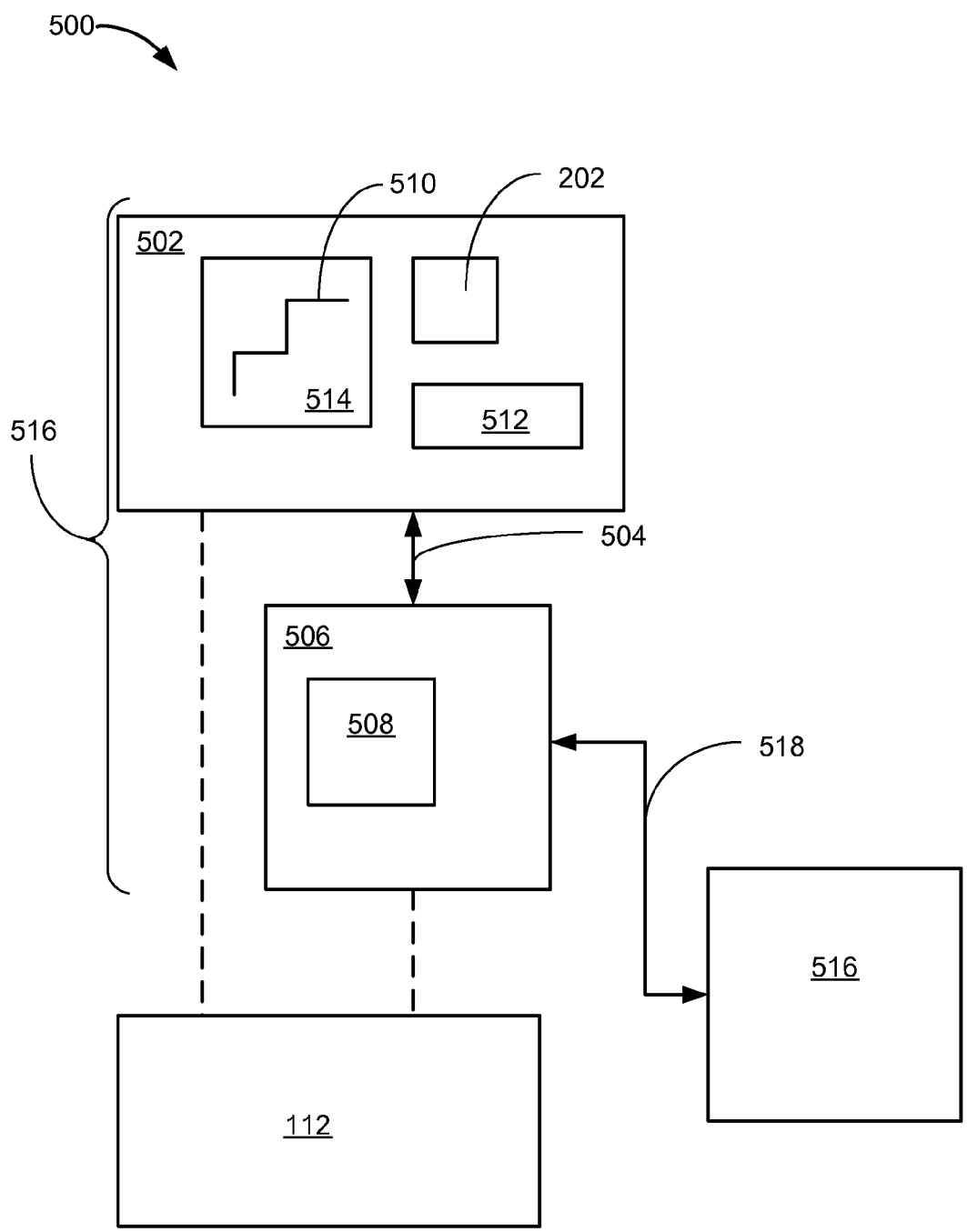
FIG. 5 is a functional block diagram of a hybrid navigation system in an embodiment of the present invention.

Referring now to FIG. 5, therein is shown a functional block diagram of a hybrid navigation system 500 in an embodiment of the present invention. The functional block diagram of the hybrid navigation system 500 depicts a first device 502 linked by a communication link 504 to a second device 506.

The second device 506 may have collected saved route information 508 for use by the first device 502 when the regional network 112 may not be available for providing route information on a planned route 510. The saved route information 508 may be transferred across the communication link 504 to a navigation controller 512 in the first device 502. Under control of the electronic control unit 202, the navigation controller 512 may display the saved route information 508 on an operator display screen 514. This operation may continue for as long as there is a sufficient amount of the saved route information 508 to support the requirements of the operator 110, of FIG. 1. When the regional network 112 is once again available new information will be added to the saved route information 508 without any intervention by the operator 110.

The first device 502 that is linked to the second device 506 serving as a proxy server may be designated a hybrid navigation cell 516, more specifically a peer-to-peer server. The hybrid navigation cell 516 can link any other of the hybrid navigation cell 516 in close proximity by a peer-to-peer wireless link 518 for exchanging the saved route information 508 or refining the current location information in the first device 502. More specifically, the second device 506 can operate as the hybrid navigation cell 516 for peer-to-peer communication with any other of the hybrid navigation cell 516 over the peer-to-peer wireless link 518.

The partition as described above is an example only and other partitions are possible. For example the saved route information 508 may be stored in the first device 502 and the second device 506 may actively poll the regional network for additional information. This operation may provide highly reliable navigation information including location based services when the regional network 112 is not consistently available.

Figure 6:
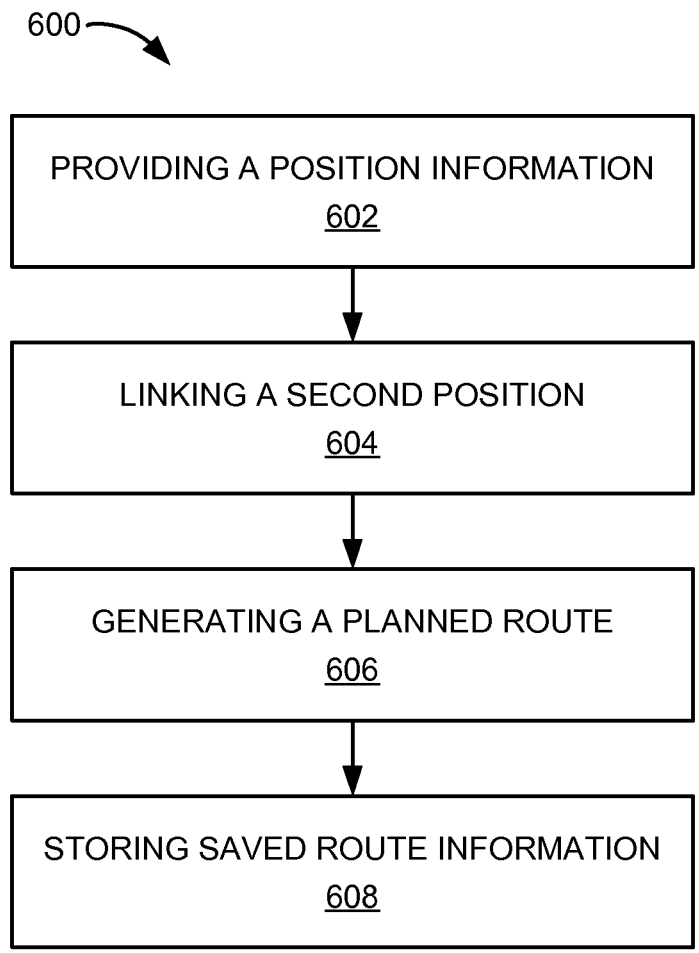
FIG. 6 is a flow chart of a method of operation of the hybrid navigation system in a further embodiment of the present invention.

Referring now to FIG. 6, therein is shown a flow chart of a method 600 of operation of the hybrid navigation system 100 in a further embodiment of the present invention. The method 600 includes: providing a position information for locating a first device in a block 602; linking a second position to the position information, the second position for locating a second device in a block 604; generating a planned route with the position information refined by the second position for transferring over a regional network to the first device or the second device in a block 606; and storing saved route information from the planned route for displaying on the first device when the regional network is not available in a block 608.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization.

Another important aspect of the present invention is that it valuably supports and services the historical trend of reducing costs, simplifying systems, and increasing performance.

These and other valuable aspects of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters hithertofore set forth herein or shown in the accompanying drawings are to be interpreted in an illustrative and non-limiting sense.

What is claimed is:

1. A method of operation of a hybrid navigation system comprising:
    locating a first device includes transferring a position information over a regional network accessed by the first device or a second device;
    linking a second position to the position information by a control unit, the second position for locating the second device including forming a hybrid navigation cell;
    generating a planned route with the position information refined by the second position from the hybrid navigation cell;
    storing saved route information including location based services along the planned route;
    utilizing the second device as a proxy server, when the regional network is not available, for locating a proximate hybrid navigation cell;
    establishing a peer-to-peer wireless link with the proximate hybrid navigation cell;
    transferring the saved route information through the peer-to-peer wireless link; and
    storing the saved route information from the peer-to-peer wireless link including transferring the saved route information to the first device when the regional network is not available, the location based services including restaurants, gas stations, repair service, and hotels.

2. The method as claimed in claim 1 wherein providing the position information for locating the first device includes providing a communication link for accessing a mobile navigation system.

3. The method as claimed in claim 1 wherein storing the saved route information includes forming the hybrid navigation cell for transferring the saved route information by operating the second device as the proxy server.

4. The method as claimed in claim 1 wherein linking the second position for locating the second device includes linking the second position for locating a cellular phone, a personal digital assistant, or a notebook computer.

5. The method as claimed in claim 1 wherein:
    linking the second position to the position information includes providing the second position for triangulating a location of the second device from two or more nodes in the regional network.

6. A method of operation of a hybrid navigation system comprising:
    transferring a position information over a regional network for locating a first device includes providing a communication link controller for communicating with a mobile navigation system having a controller area network;
    linking a second position to the position information by a control unit, the second position for locating a second device includes forming a hybrid navigation cell by coupling the first device and the second device to the controller area network by a wireless link;
    generating a planned route with the position information refined by the second position from the hybrid navigation cell;
    storing saved route information including location based services along the planned route;
    utilizing the second device as a proxy server, when the regional network is not available, for locating a proximate hybrid navigation cell;
    establishing a peer-to-peer wireless link with the proximate hybrid navigation cell;
    transferring the saved route information through the peer-to-peer wireless link; and
    storing the saved route information from the peer-to-peer wireless link including transferring the saved route information to the first device when the regional network is not available, the location based services including restaurants, gas stations, repair service, and hotels.

7. The method as claimed in claim 6 wherein providing the position information for locating the first device includes providing a communication link for accessing the mobile navigation system having an electronic control unit.

8. The method as claimed in claim 6 wherein storing the saved route information includes forming the hybrid navigation cell for transferring the saved route information by operating the second device as the proxy server including coupling the first device for coupling a peer-to-peer server within 10 meters range.

9. The method as claimed in claim 6 wherein linking the second position to the position information includes providing a communication link for linking a cellular phone, a personal digital assistant, or a notebook computer including linking a Bluetooth to the controller area network.

10. The method as claimed in claim 6 wherein:
providing the position information for locating the first device includes accessing the position information for providing the position information from a data source through the regional network including accessing a satellite.

11. A hybrid navigation system comprising:
a location unit, including a global positioning system locator, configured to transfer a position information, for locating a first device, over a regional network accessed by the first device or a second device;
a control unit, including a processor, coupled to the location unit, configured to:
  link a second position to the position information, the second position for locating the second device to form a hybrid navigation cell,
  generate a planned route with the position information refined by the second position from the hybrid navigation cell,
  store saved route information including location based services along the planned route,
  utilize the second device as a proxy server, when the regional network is not available, to locate a proximate hybrid navigation cell,
  establish a peer-to-peer wireless link with the proximate hybrid navigation cell, and
  transfer the saved route information through the peer-to-peer wireless link; and
a memory device, coupled to the control unit, configured to store the saved route information from the peer-to-peer wireless link, includes the saved route information transferred to the first device when the regional network is not available, the location based services include restaurants, gas stations, repair service, and hotels.

12. The system as claimed in claim 11 wherein the first device includes a mobile navigation system with an electronic control unit.

13. The system as claimed in claim 11 wherein the first device forms the hybrid navigation cell for transferring the saved route information by operating the second device as the proxy server.

14. The system as claimed in claim 11 wherein the control unit includes a communication link controller for linking the second position for locating a cellular phone, a personal digital assistant, or a notebook computer.

15. The system as claimed in claim 11 wherein:
the control unit configured to link the second position to the position information including providing the second position for triangulating the second position from two or more nodes, in the regional network.

16. The system as claimed in claim 11 wherein the control unit includes:
a communication link controller for communicating with a mobile navigation system having a controller area network.

17. The system as claimed in claim 16 wherein the communication link controller is for accessing a mobile navigation system with an electronic control unit.

18. The system as claimed in claim 16 wherein the first device forms the hybrid navigation cell for transferring the saved route information by operating the second device as the proxy server including coupling the first device for coupling a peer-to-peer server within 10 meters range.

19. The system as claimed in claim 16 wherein the communication link controller is for providing a communication link for linking the second position for locating a cellular phone, a personal digital assistant, or a notebook computer coupled to the controller area network.

20. The system as claimed in claim 16 wherein the first device includes:
the control unit for providing a position information for locating a first device from a data source accessed through the regional network by a satellite.

* * * * *